United States Patent [19]

Mattern

[11] 4,124,438
[45] Nov. 7, 1978

[54] METHOD OF AND APPARATUS FOR IMPROVING THE HEAT EXCHANGE IN NATURAL-CIRCULATION AND FLOW-THROUGH EVAPORATORS

[75] Inventor: Konrad Mattern, Bad Homburg, Fed. Rep. of Germany

[73] Assignee: Ekono Oy, Helsinki, Finland

[21] Appl. No.: 798,882

[22] Filed: May 20, 1977

Related U.S. Application Data

[63] Continuation-in-part of Ser. No. 611,643, Sep. 9, 1975, abandoned.

[30] Foreign Application Priority Data

Sep. 11, 1974 [DE] Fed. Rep. of Germany ....... 2443393

[51] Int. Cl.² ............................................. B01D 1/00
[52] U.S. Cl. .................. 159/47 R; 159/16 S; 159/27 A; 159/27 B; 159/17 R
[58] Field of Search ................. 159/16 A, 16 S, 27 R, 159/27 A, 27 B, 17 R, 17 C, 28 R, 20 R, 43 A, 17 P, 14, 46, 47

[56] References Cited

U.S. PATENT DOCUMENTS

| | | | |
|---|---|---|---|
| 411,012 | 9/1889 | Chapman | 159/28 R |
| 521,974 | 6/1894 | Cooper | 159/27 A |
| 1,028,738 | 6/1912 | Kestner | 159/14 |
| 1,060,607 | 5/1913 | Kestner | 159/17 R |
| 1,191,108 | 7/1916 | Kestner | 159/27 A |
| 1,945,281 | 1/1934 | Leithauser | 159/16 S |
| 2,184,579 | 12/1939 | Brucke | 159/16 S |
| 2,519,618 | 8/1950 | Wilson | 159/14 R |
| 2,676,651 | 4/1954 | Lavigne | 159/16 S |
| 2,954,013 | 9/1960 | Stengel | 159/27 S |

FOREIGN PATENT DOCUMENTS

| | | | |
|---|---|---|---|
| 3,723 | 2/1901 | Denmark | 159/27 A |
| 576,500 | 4/1921 | France | 159/24 R |
| 884,254 | 8/1943 | France | 159/17 R |
| 487,236 | 6/1938 | United Kingdom | 159/16 S |
| 117,357 | 7/1957 | U.S.S.R. | 159/16 S |

*Primary Examiner*—Norman Yudkoff
*Attorney, Agent, or Firm*—Karl F. Ross

[57] ABSTRACT

Heat exchange is improved in natural-circulation and flowthrough evaporators in which the liquid to be evaporated is admitted to heating tubes and evaporators therein as the fluid rises in the tubes. According to the invention the liquid is preheated under a higher hydrostatic pressure than at the inlet to the heating tubes by treatment with direct steam, preferably in a steam-jacketed siphon tube forming a downcomer from a separator removing concentrate from the vapors emerging from the evaporator.

2 Claims, 4 Drawing Figures

METHOD OF AND APPARATUS FOR IMPROVING THE HEAT EXCHANGE IN NATURAL-CIRCULATION AND FLOW-THROUGH EVAPORATORS

CROSS REFERENCE TO PATENT APPLICATIONS

This application is a continuation-in-part of Ser. No. 611,643 filed Sept. 9, 1975, now abandoned.

FIELD OF THE INVENTION

This invention relates to a method of and to an apparatus for improving heat exchange in natural-circulation and flowthrough evaporators.

BACKGROUND OF THE INVENTION

Various types of evaporators are used to concentrate liquids or to recover solvents, e.g. from solutions, suspensions, emulsions or the like. In the evaporator, the concentration of the several substances in the liquid is increased and part of the evaporated liquid flows through a separator, in which condensed constituents are removed, to another evaporator stage, whereas the condensate is returned through downcomers. The concentrate which is still pumpable may be the end product, or this end product may be discarded and only the vapors recovered, e.g. as fresh water produced by a distillation of sea water.

In most evaporators, a heater, e.g. a steam-heated tube-type heat exchanger, is used to heat the liquid to be treated to the boiling temperature so that the liquid evaporates (*Grundlagen der chem. Technik*, Vol. 4, Heat Exchangers, by Roman Gregory, 1959, Verlag H. R. Sauerländer, Aarau).

In so-called natural-circulation evaporators, a so-called "apparent liquid level" results during operation. This apparent liquid level is detected by a liquid-level indicator, which is connected to the liquid space below the heating tubes and to the vapor space above the heating tubes. For instance, when the liquid-level indicator of a circulating evaporator having heating tubes 2 m long indicates that the tubes are "half filled", this means that the pressure at the tube inlet exceeds the pressure at the outlet by a head of 1 m of the liquid. The fluid rising from the tubes can be delivered by the downcomers to the chamber below the heating tubes where the pressure is 1 m of liquid column higher than the boiling pressure.

If an evaporator for evaporating water from an aqueous solution is operated at an evaporating temperature of 50° C., a pressure of 0.125 kg/cm² (absolute pressure of 0.125 atm) will prevail in the evaporator space above the heating tubes. In this example the pressure at the inlet of the tubes will be 0.125 kg + 0.1 kg = 0.225 kg per square centimeter (absolute pressure) or 0.125 atm (abs) + 0.1 atm (abs) = 0.225 atm (abs) if it is assumed that the specific gravity of the material to be concentrated equals unity. Without an increase of the boiling point, an aqueous solution under 0.225 kg/sq.cm (absolute pressure) or 0.225 atm (abs) boils at 61° C. so that the material to be concentrated cannot boil at the inlet of the tubes. Because the material to be concentrated rises in the parallel heating tubes at a velocity of only about 1 cm/sec., it is preheated along a fairly long path before the evaporation in the heating tubes can begin.

Owing to the low velocity of flow, there is only a small heat transfer in the preheating zone and depositions of solids on the heating surface tend to take place preferentially in this zone and may further reduce the heat transfer.

Flowthrough evaporators for cascade operation comprise evaporator segments or evaporators which are connected in series for the flow of liquid. When the material to be concentrated has risen in heating tubes, it flows through downcomers to other heating tubes in which the material rises again as it is evaporated. The weight of the liquid in the heating tubes, the acceleration of the material to be concentrated and of the vapor, and the pipe friction result in a pressure difference between the heating-tube inlet disposed on a lower level and the heating-tube outlet disposed on an upper level. In heating tubes 4 m long, for instance, the pressure difference between the upper and lower ends may amount to 2 m of liquid. With an evaporating temperature of 50° C., an aqueous solution to be concentrated begins to boil at the tube inlet only at 71° C. The liquid entering the heating tubes at about 1 cm/sec must be preheated if the temperature rise and pressure drop are to permit the evaporation to begin during the upward flow.

OBJECT OF THE INVENTION

It is an object of the invention to avoid these disadvantages, i.e. to avoid the low heat transfer in the lower portion of the heating tubes of the evaporators, in which the liquid is heated to the boiling temperature, and to provide the circulating evaporator with simple, technologically effective means which ensure that the liquid is heated to the boiling temperature before it enters the heating tubes.

SUMMARY OF THE INVENTION

This object is accomplished in that the material to be concentrated is heated to the boiling temperature before it enters the heating tubes by a treatment with direct steam and during this heating is maintained under a higher hydrostatic pressure than at the heating-tube inlet.

According to a preferred embodiment of the method, direct steam is supplied to the lower end of a so-called "double-tube siphon", which consists of two concentric tubes and is connected to the evaporator and the succeeding separator. The double-tube siphon has an annular elongated passage defined between two walls to which steam is admitted and can also be described as a steam-jacketed siphon tube.

The provision of a siphon at the evaporator and separator results in a higher hydrostatic pressure at the lower end of the siphon, and a heating to a correspondingly higher temperature or to the boiling temperature can be effected depending upon the length of this siphon.

According to another preferred feature, direct steam is supplied which flows upwardly in the annular cross-section of the siphon between two concentric tubes.

According to a preferred feature of this invention, a swirl is produced in the annular cross-section of the double-wall siphon consisting of two concentric tubes.

The siphon tube consists virtually of a double tube comprising an inner tube and an outer tube separated by a space of annular cross-section inner and outer tubes. The direct steam is tangentially introduced at the bottom to produce a swirl and thus improves the heat transfer.

According to a preferred feature of the invention, a partial stream of steam from the heater of the evaporator is used as direct steam.

According to the invention, steam in direct contact is used for a preheating to a temperature which exceeds the temperature corresponding to the pressure at the heating-tube inlet. The preheating for each evaporator or evaporator segment is effected outside the evaporator. The preheating vapor or steam is metered only at one point. As a result of the invention, the heat transfer is much improved and the throughput rate of the evaporator may be increased or the evaporator may be smaller in size.

BRIEF DESCRIPTION OF THE DRAWING

The above and other features of my invention will be explained more fully and by way of example with reference to the accompanying drawing, in which.

SPECIFIC DESCRIPTION AND EXAMPLE

Figure 1:
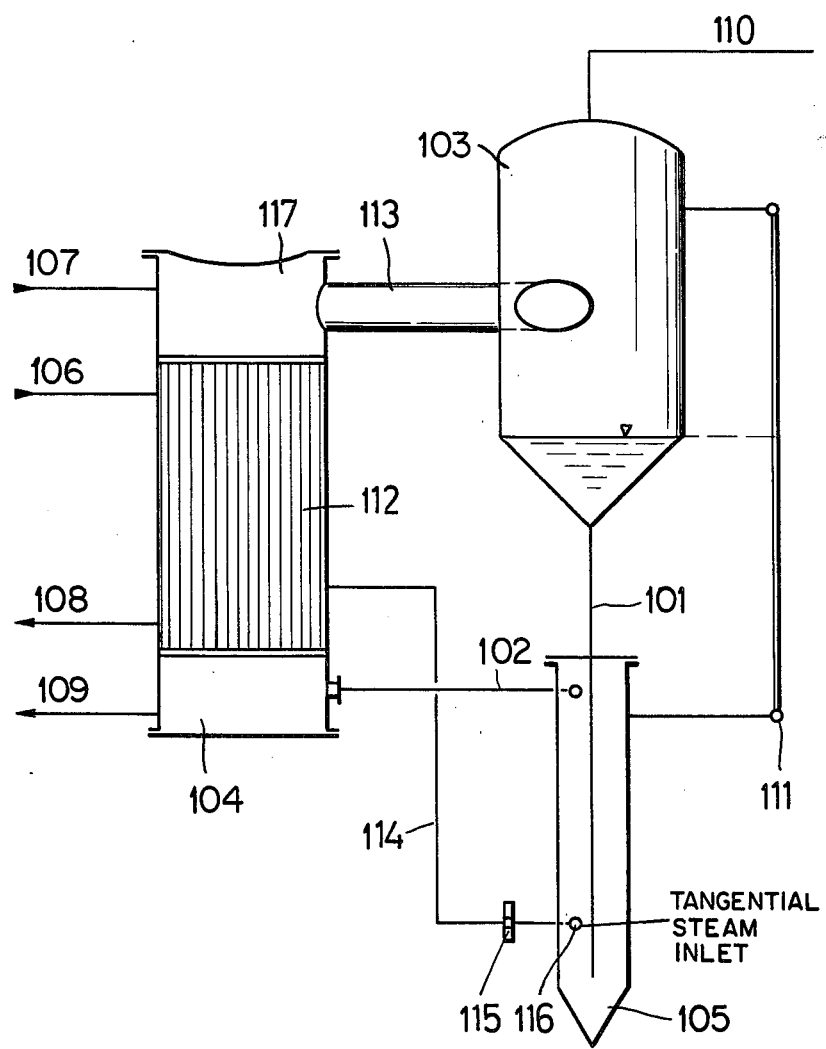
FIG. 1 is an arrangement of a natural-circulation evaporator in accordance with the invention.

FIG. 1 shows a return pipe 101, 102 which connects a separator 103 to the lower portion of an evaporator 104, and a preheater 105, according to the invention, inserted into said return pipe.

Heating steam is supplied through conduit 106 into the space which surrounds the heating tubes. The material to be concentrated is fed to the evaporator through conduit 107. The condensate formed by the heating steam is discharged through a conduit 108. Concentrate is withdrawn through conduit 109 in batches or continuously. The vapors formed as a result of the evaporation are passed through a conduit 110 to a condenser.

The operation of such evaporator is controlled depending upon the "apparent liquid level", which is indicated by a liquid-level indicator 111.

The material to be concentrated rises in heating tubes 112 and the concentrated material flows through a pipe 113 into the separator 103, passes through the pipe 101 into the lowermost portion of the preheater 105, and then rises in the annular space between the pipe 101 and the shell of the preheater 105 and finally returns through pipe 120 into the evaporator 104.

As the material flows through the preheater 105, steam is injected from the outside through a conduit 114 at an inlet 116 close to the lower end of central tube 101. The steam rate is controlled by an orifice plate or nozzle 15. The conduits 114 and 102 are suitably tangentially connected to the housing of the preheater 105 so that the preheating steam is tangentially admitted and the preheated material to be concentrated is tangentially discharged.

When in the arrangement described hereinbefore the apparent liquid level in the evaporator is 1 m and the conduit 114 is connected to the preheater vessel 105 at a point which is 1 m below the heating-tube inlet, the pressure at the steam inlet 116 to the preheater exceeds the pressure in the vapor space of the evaporator by 2 m of liquid.

In case of an evaporator temperature of 50° C., corresponding to a pressure of 0.25 kg/cm² (absolute pressure), and a specific gravity = 1 of the liquid in the evaporator, the pressure at the tangential steam inlet 116 will be 0.325 kg/cm² (absolute pressure). The corresponding evaporation temperature is 70° C. so that a temperature difference of 20° C. is available at this point for a transfer of heat.

Figure 2:
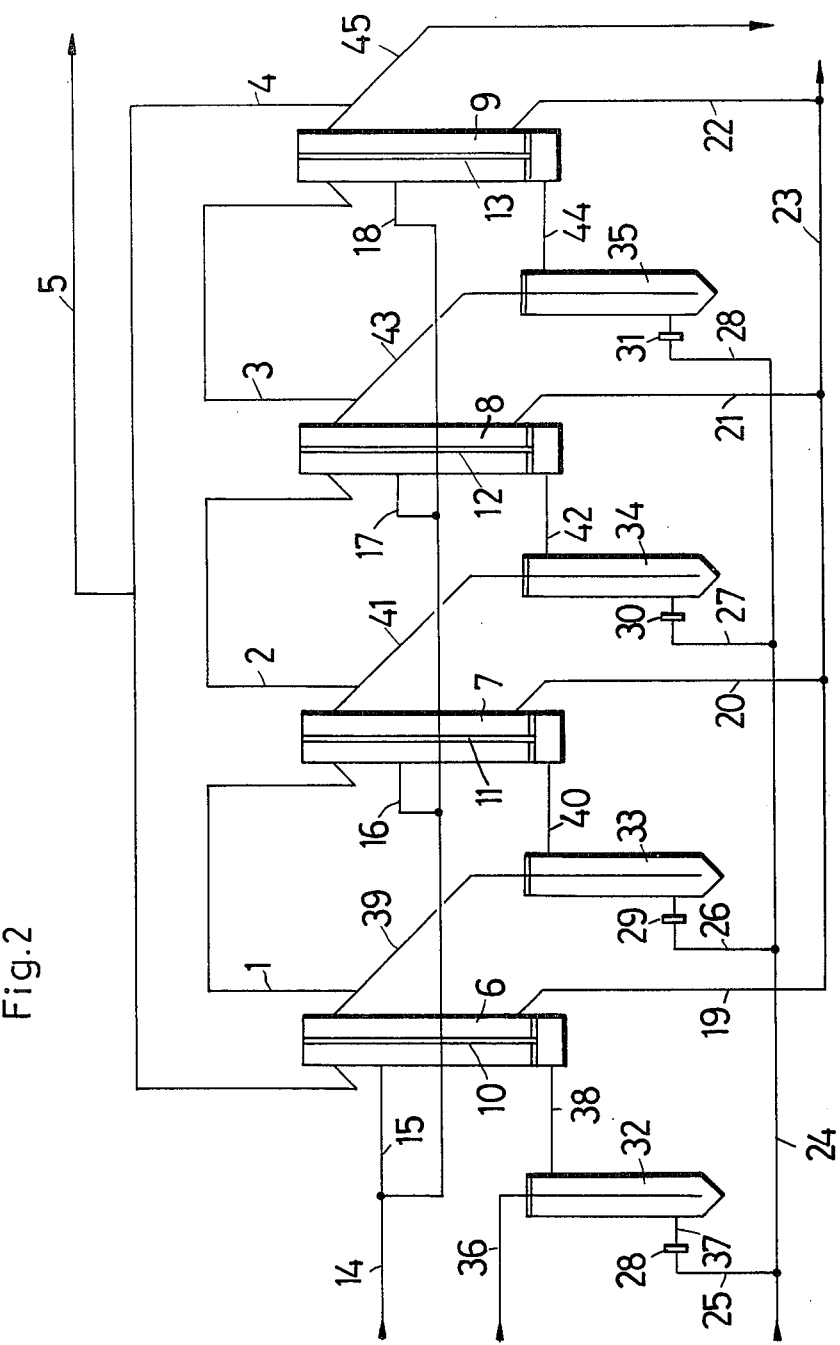
FIG. 2 shows a multistage evaporating plant based on the same principle.

The significance of the invention is particularly apparent from the embodiment illustrated in FIG. 2.

FIG. 2 represents an evaporator or an evaporator stage for a delicate product. The material to be concentrated must be treated at a predetermined temperature. Backmixing is not permissible for bacteriological reasons. A stagnation or laminar flow condition would cause gelling in such areas.

The evaporator consists of four units 1, 2, 3, 4, which are interconnected on the vapor side by columns 1', 2', 3', 4' and ducts 1", 2", 3". The collected vapor is discharged from the evaporator through conduit 5. The lower portion of each evaporator unit is provided with a heater 6, 7, 8 or 9, which contains heating tubes 10, 11, 12, 13. Heating steam is supplied to the evaporator units in parallel through a manifold 14 and branch conduits 15, 16, 17, 18. The condensate formed from the heating steam is discharged through conduits 19, 20, 21, 22 and the manifold 23. The steam for the direct preheating and intermediate preheating is supplied to the preheaters 32, 33, 34, 35 provided according to the invention through the manifold 24 and the conduits 25, 26, 27, 28, which contain orifice plates 28, 29, 30, 31.

Figure 3:
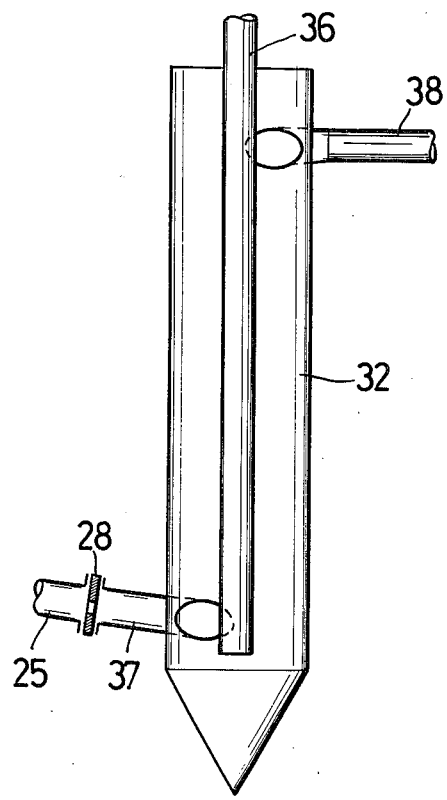
FIG. 3 is an elevation showing the siphon tube.

FIG. 3 shows the siphon preheater 32 by way of example on a somewhat larger scale.

In this example the saturated-vapor temperature is 40° C., corresponding to a pressure of 0.075 kg/cm² (absolute pressure). The material to be concentrated is at 30° C. and is fed through the conduit 36 at a metered rate to enter the evaporator at a point below the outlet of conduit 25. Preheating steam is added through conduit 25 at a surplus rate, which is controlled by the orifice plate 32.

In the heating tubes 10, the flow and the conveyance of the evaporating liquid result in a pressure loss of about 0.5 m of water. If the difference in height between the outlets of the pipes 37 and 38 is 1 m, the pressure difference may amount to as much as 1.5 m of water so that the material to be concentrated can be heated to about 55° C. before entering the heating tubes.

The boiling temperature at the inlet to the heating tubes 10 is 50° C. so that the material to be concentrated enters the heating tubes 10 under evaporating conditions. When the material to be concentrated has risen in the heating tubes 10, it flows through conduit 39 into the preheater 33 and is preheated therein to such a temperature that it is being fed under evaporating conditions through conduit 40 to the heating tubes 11.

The material to be concentrated flows in the manner described hereinbefore through conduit 41, preheater 34, conduit 42, unit 3, conduit 43, preheater 35, and conduit portion 44 into the evaporator 4. Material which has the desired concentration is withdrawn from unit 4 through conduit 45.

Figure 4:
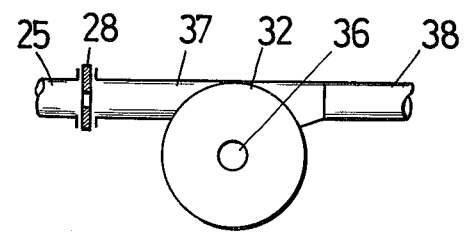
FIG. 4 is a top plan view showing the siphon tube.

FIG. 4 is a top plan view showing a preheater for carrying out the invention. It is apparent that the pipe outlets 37 for the steam and 38 for the liquid to be evaporated are suitably tangentially connected to the housing 32 so that a swirl is produced.

I claim:

1. A method of improving heat exchange in natural-circulation and flowthrough evaporators, comprising the steps of:

a. passing a liquid upwardly through a multiplicity of upright externally heated heating tubes from inlets at the bottom thereof to evaporate said liquid at least partially within said tubes;

b. applying to said liquid prior to its admission to said multiplicity of tubes at said inlets a hydrostatic pressure heat greater than that of the liquid at said inlets, said greater hydrostatic pressure being produced by draining feed liquid derived from upper ends of the heating tubes downwardly through the central tube of a concentric-tube siphon located below the heating-tube inlets and causing the liquid passed through said central tube to rise in an annular space within said siphon;

c. contact-heating said liquid at said higher hydrostatic pressure head with direct steam to raise the temperature of said liquid at least to its boiling temperature at the pressure of said liquid at the inlet of the heating tubes, and direct steam being injected tangentially from outside the siphon into said annular space within the siphon at the lower end thereof and close to the lower end of said central tube, thereby contacting the steam with the rising liquid in said space and inducing a swirling motion;

d. passing the resulting vapor-liquid mixture from the top of the annular space to said inlets of the heating tubes; and e. separating vapor from liquid from said upper ends of said heating tubes and delivering the separated liquid and the drained feed liquid to the central tube of the siphon, the separation of the vapor from liquid being carried out at a location above said siphon.

2. An apparatus for concentrating a liquid, comprising:

a. an evaporator having a lower space, a multiplicity of heating tubes rising from and communicating with said lower space, and an upper space communicating with said heating tubes;

b. a liquid-vapor separator connected with the upper space of said evaporator for separating vapor from a liquid concentrate formed by evaporation of liquid in the heating tubes;

c. a preheater comprising an inner tube connected with said liquid-vapor separator for draining the separated liquid concentrate therefrom to a lower end of said inner tube, said preheater being a siphon further comprising an outer tube defining with said inner tube an annular space in which liquid rises around the inner tube, said annular space being connected at its upper end to the lower spece of said evaporator for delivering liquid thereto; and d. means for injecting steam tangentially from outside the siphon into said annular space at the lower end thereof and close to the lower end of said inner tube for preheating the rising liquid therein by direct contact with steam, said siphon being disposed below the heating tubes of said evaporator and below said separator.

* * * * *